(12) United States Patent
Dellinger et al.

(10) Patent No.: US 10,594,930 B2
(45) Date of Patent: *Mar. 17, 2020

(54) IMAGE ENHANCEMENT AND REPAIR USING SAMPLE DATA FROM OTHER IMAGES

(71) Applicant: Apple Inc., Cupertino, CA (US)

(72) Inventors: Richard R. Dellinger, San Jose, CA (US); Alessandro F. Sabatelli, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,402

(22) Filed: Feb. 11, 2019

(65) Prior Publication Data

US 2019/0246037 A1    Aug. 8, 2019

Related U.S. Application Data

(63) Continuation of application No. 15/449,286, filed on Mar. 3, 2017, now Pat. No. 10,205,875, which is a continuation of application No. 13/454,782, filed on Apr. 24, 2012, now Pat. No. 9,626,747.

(51) Int. Cl.
| | |
|---|---|
| *H04N 5/232* | (2006.01) |
| *G06F 16/51* | (2019.01) |
| *G06F 16/583* | (2019.01) |
| *G06F 16/58* | (2019.01) |

(Continued)

(52) U.S. Cl.
CPC ......... *H04N 5/23222* (2013.01); *G06F 16/51* (2019.01); *G06F 16/5854* (2019.01); *G06F 16/5866* (2019.01); *G06K 9/00228* (2013.01); *G06K 9/00255* (2013.01); *G06T 5/005* (2013.01); *H04N 5/23219* (2013.01); *G06T 2207/30201* (2013.01); *G06T 2207/30216* (2013.01)

(58) Field of Classification Search
USPC .................................................. 382/254, 305
See application file for complete search history.

(56) References Cited

U.S. PATENT DOCUMENTS

| | | |
|---|---|---|
| 6,574,375 B1 | 6/2003 | Cullen |
| 6,788,809 B1 | 9/2004 | Grzeszczuk |
| 7,804,982 B2 | 9/2010 | Howard |

(Continued)

*Primary Examiner* — Ishrat I Sherali
(74) *Attorney, Agent, or Firm* — Blank Rome LLP

(57) ABSTRACT

Techniques for capturing images are described. In one scenario, one or more processors of an imaging device can obtain geodata information and time information associated with the imaging device. The geodata and time information is obtained prior to capturing a first image. Next, one or more second images can be identified from a database of images based on the geodata information and the time information. The processor(s) can be communicatively coupled to the database via a communications network. Additionally, the one or more processors can determine one or more image capture conditions associated with the one or more second images; and automatically modify one or more settings of the imaging device to be used for capturing the first image. The settings can be modified based on at least one of the one or more image capture conditions associated with the one or more second images. Other embodiments are possible.

21 Claims, 5 Drawing Sheets

(51) Int. Cl.
*G06K 9/00* (2006.01)
*G06T 5/00* (2006.01)

(56) References Cited

U.S. PATENT DOCUMENTS

| | | |
|---|---|---|
| 7,970,181 B1 | 6/2011 | Brandt |
| 8,131,116 B2 | 3/2012 | Motomura |
| 8,208,764 B2 | 6/2012 | Guckenberger |
| 8,488,893 B2 | 7/2013 | Itoh |
| 8,665,340 B2 | 3/2014 | Prentice |
| 8,971,612 B2 | 3/2015 | Shotton et al. |
| 9,172,938 B2 | 10/2015 | Yoneda et al. |
| 9,386,230 B1 | 7/2016 | Duran et al. |
| 9,413,965 B2 | 8/2016 | Ryu |
| 9,626,747 B2 | 4/2017 | Dellinger et al. |
| 10,205,875 B2 * | 2/2019 | Dellinger ............... G06T 5/005 |
| 10,321,051 B2 * | 6/2019 | Balasubramanian ...................... H04N 5/23222 |
| 2008/0196076 A1 | 8/2008 | Shatz |
| 2009/0238419 A1 | 9/2009 | Steinberg |
| 2009/0304239 A1 | 12/2009 | Itou |
| 2010/0158410 A1 | 6/2010 | Kusakabe |
| 2011/0102630 A1 | 5/2011 | Rukes |
| 2011/0292221 A1 | 12/2011 | Gu |
| 2012/0250937 A1 | 10/2012 | Corcoran |
| 2013/0246409 A1 | 9/2013 | Polansky |
| 2014/0126881 A1 | 5/2014 | Yoneda |
| 2015/0085145 A1 * | 3/2015 | Sinha ................ H04N 5/23222 348/207.1 |
| 2017/0064205 A1 | 3/2017 | Choi |

* cited by examiner

IMAGE ENHANCEMENT AND REPAIR USING SAMPLE DATA FROM OTHER IMAGES

BACKGROUND

This disclosure relates generally to the field of image manipulation. More particularly, but not by way of limitation, it relates to techniques for enhancing and repairing images using data from other images.

Photography has been an innovative field since the earliest crude photographs were produced, developing from camera obscura and pinhole cameras to chemically-developed film cameras in the 19$^{th}$ century to digital cameras in the late 20$^{th}$ century. With digital photography has come an ability to manipulate images, providing capabilities not practical or possible with film. Individuals may easily create or collect libraries of thousands of digital images, using software to organize and manipulate images in those libraries. In addition to standalone imaging devices such as traditional cameras, imaging devices are now ubiquitous in a wide variety of other devices, including smartphones and tablet computers.

However, as any photographer knows, not every photograph is a good one. Sometimes the photograph includes an image of a person whose face is blocked, blurry, or whose eyes were closed when the photograph was taken. Sometimes the image may show a spot or temporary blemish on the person's nose or somewhere else visible in the image.

Other times, a photographer may take a picture at some location and for some reason the photograph was taken with an incorrect exposure setting or out of focus, or the photographer inadvertently moved the camera while taking the photograph. Sometimes a photograph may contain some blurry object, such as a random person walking the camera and the subject of the photograph just as the photograph was taken.

While image manipulation techniques exist that may be used to manipulate areas of a photograph, such as the ability to remove the "red-eye" effect when using a photographic flash unit caused by reflection of light by the person's eyes. Other techniques have allowed cloning tools or healing brush tools that use sample data from other points on the photograph to correct imperfections, causing them to blend with the surrounding area of the image. While useful, these existing tools are not always capable of repairing or correcting a photograph as much as would be desired.

SUMMARY

A image manipulation technique allows a user to correct an image using samples obtained from other images. These samples may be obtained from one or more other images in a library of images. Matching techniques may identify an image that best matches the image to be corrected, or may aggregate or average multiple images that are identified as containing an area corresponding to the area to be corrected. Identification of the image or images to use as the source of the samples may be automatic or manual. The images may be from a library of images under the control of the user or from a library of images maintained by another person or service provider. Application of the samples to correct the image may be manually or automatically directed.

An image modification method is disclosed. The method includes selecting a first region of a first image; identifying automatically, from a database of images, one or more second images, wherein each of the one or more second images has a region corresponding to the first region; and modifying automatically the first region based, at least in part, on the corresponding region from at least one of the one or more second images.

A non-transitory program storage device is disclosed. The storage device is readable by a programmable control device and has instructions stored thereon to cause the programmable control device to receive an indication that identifies a first region of a first image; identify, from a database of images, one or more second images, wherein each of the one or more second images has a region corresponding to the first region; and modify the first region based, at least in part, on the corresponding region from at least one of the one or more second images.

An programmable device is disclosed. The device includes a programmable control device; a memory coupled to the programmable control device; and software stored in the memory. The software includes instructions causing the programmable control device to receive an indication that identifies a first region of a first image; identify automatically one or more second images from a collection of images, wherein each of the one or more second images has a region corresponding to the first region; and modify the first region automatically based, at least in part, on the corresponding region from at least one of the one or more second images.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to refer ence all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

By using samples from libraries of other images to correct or enhance an image automatically, additional capability becomes available to the photographer. Other images of a person may be used to correct or enhance an image of that person. Other images of a place may be used to enhance or correct an image of that place. The size of the sample data relative to the image to be corrected or enhanced is not limited. For example, a photograph of a landmark and the photographer's family might be manipulated by replacing the entirety of the photograph with another photograph, overlaying the photographer's family on the other photograph. Sample areas obtained from a source image may be included into a destination image at a resolution different from that of the destination image.

Figure 1:
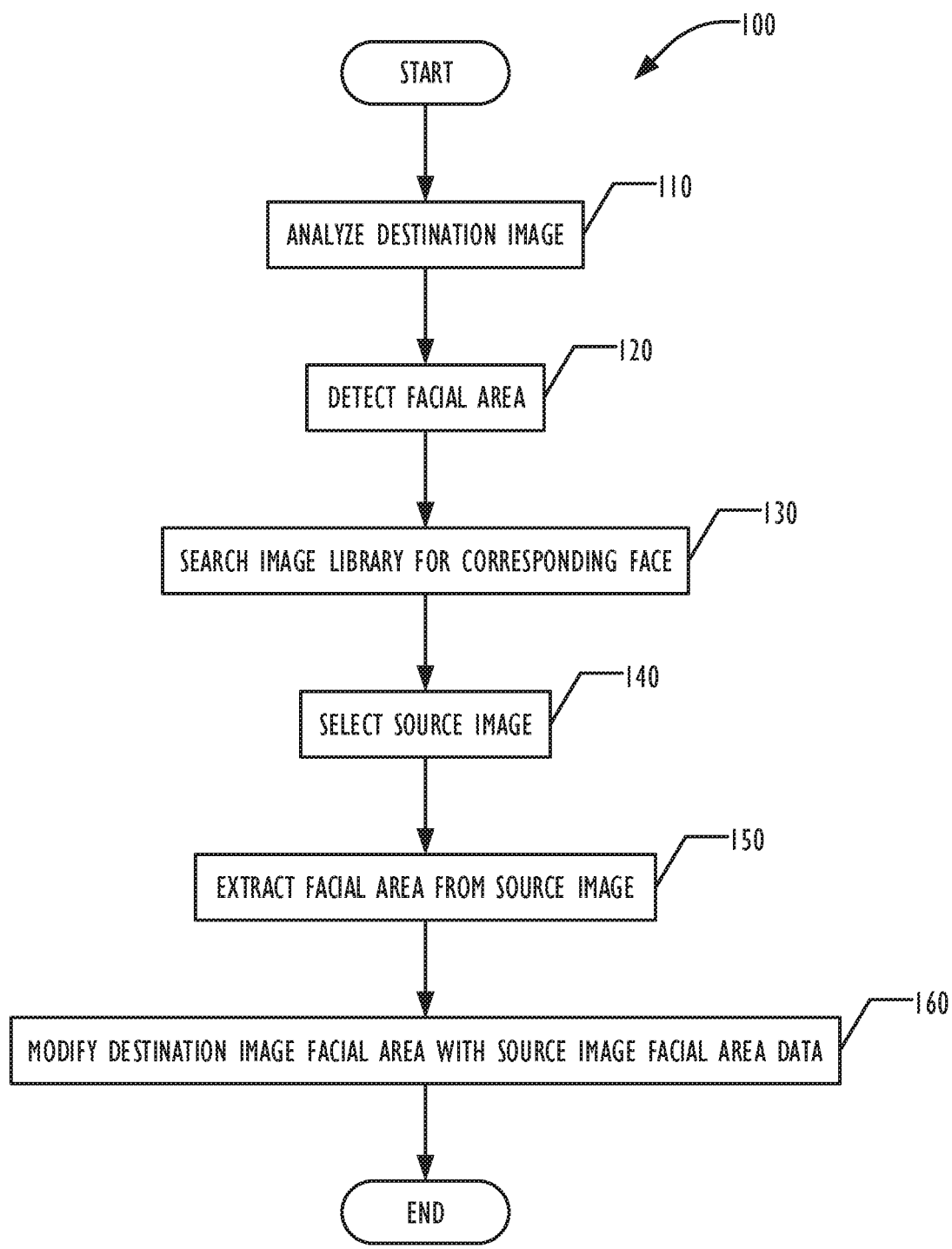
FIG. 1 is a flowchart illustrating a technique for modifying a facial region of an image with facial sample data from another image.

FIG. 1 is a flowchart illustrating a technique 100 for correcting a facial area of an image, which is identified herein as a destination image. In block 110, the destination image is analyzed using any desired analysis techniques, and a facial region is detected in block 120 using any desired facial recognition techniques. Alternatively, a user may provide an indication of the facial region using tools such as a marquee tool. In the destination image, some problem is assumed with the detected facial region (the "destination facial region"), such as blur, spots, under or over exposure, etc. In block 130, a library of other images (each of which is identified herein as a source image) may be searched for images that include the corresponding face, using information from the analysis and detection of blocks 120, 130, as well as any other desired information that may be available for use. For example, if the destination image has been tagged with label information so that the name of the person is known, that information may be used as one of the search criteria. Although referred to above as a library of other images, any desired technique for storing the collection of source images may be used, including structured or unstructured databases.

In block 140, if more than one other source image is included in the search results, a resulting source image may be selected using any desired technique, including techniques such as are described below regarding FIG. 3. More than one source image may be selected.

Once one or more source images are selected, the selected source image or images may be processed to find corresponding facial features, and a source facial region corresponding to the destination facial region may be extracted as a sample data in block 150. The destination facial region may be replaced, at least in part, with the sample data from the one or more source images. Any desired techniques may be used to fit the sample data over the existing facial region, for smoothly stitching the sample data into the original image, such as morphing or healing brush techniques known to the art, which are not further described herein.

Where the source image and the destination image were exposed with different contrast ratios, the sample data may be adjusted to the contrast ratio of the destination image. Alternately, the contrast ratio of the sample data may not be adjusted to match that of the destination image, allowing a destination image with a less than optimum contrast ration to be enhanced by a sample data from a source image with a better contrast ratio. Other image modification techniques, such as gamma correction may be used to match the sample data to the destination image if desired.

The technique 100 may be performed automatically, identifying the facial region, selecting the source image or images, and performing the modification of the source facial region without user input. A user interface may provide an auto-enhance button or other similar user interaction element to trigger the performance of the technique 100.

Alternately, user interaction may be provided for at any stage, allowing the user to approve or disapprove any or all of the identification of the facial region, the selection of the source image or images, the extraction of the sample data, and the modification of the source image based on the sample data. User-configurable setting may provide additional constraints (e.g., allowable age ranges) as well as specifying what library of images to use.

Always described above, the entire facial region may be modified, more limited facial regions, such as a distinct facial feature (e.g., a nose), as well as other less distinct regions, such as simple skin regions.

Additional predetermined criteria may further constrain facial modification using any other desired information. For example, the technique may limit the available images in the library to those within a predefined age range, to avoid making inappropriate modifications. For example, the technique may be configured to avoid modifying an image of an 80-year-old woman with facial data from an image of that woman in her teens. Other criteria may be used, such as lighting information (e.g., do not use an image taken in fluorescent light to modify an image taken an incandescent light) and resolution (e.g., use only images taken with approximately similar resolution).

Other user-specifiable criteria may include shadowing, contrast, and exposure information, and information about the imaging device used to capture the images (e.g., the destination image was taken on an IPHONE® smartphone; only use source images taken by an IPHONE smartphone or an IPAD® tablet) (IPHONE and IPAD are registered trademarks of Apple Inc.). Temporal windows may provide constraints such as a constraint that limits source images to those taken at roughly the same age as the person represented in the destination image. Temporal windows may also be used to limit the source images to those taken in a narrow time range, such as a single photography session.

As described above, the technique 100 is used for correcting or enhancing a destination image. However, the same technique may be used for other purposes to modify facial regions of an image. The source images may be images of the person represented in the source image, but may also be images of other people. For example, a plastic surgeon may use the technique to provide a patient an idea of how the patient may look after surgery, and the selection process may either use a library of images of the patient (e.g., when doing reconstructive surgery, using images of the patient before the injury) or of other people (e.g., modifying the source image to give a cosmetic surgery patient an idea of how they may look after the surgery).

The number of images in the library may affect the usefulness of the technique. For example, a collection of images of a person with only a handful of images is less likely to produce as good a result as a library of hundreds or thousands of images. The library of images may be a personal library, or may be a library to which multiple people have submitted multiple images of multiple people.

Figure 2:
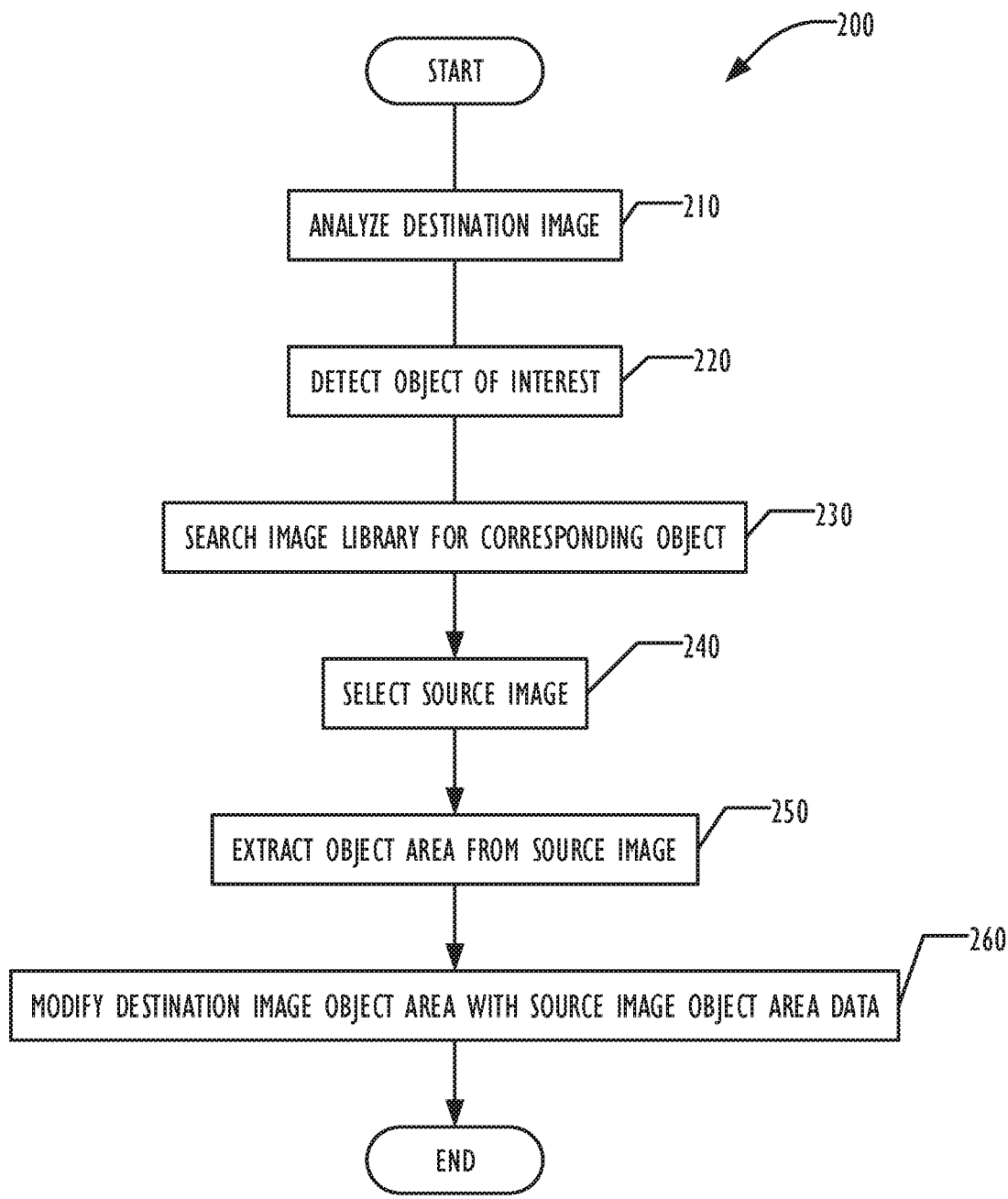
FIG. 2 is a flowchart illustrating a technique for modifying a region representing an object in an image with sample data corresponding to the object from another image.

The techniques described herein are not limited to modification of facial regions, but may be used for modifying any object represented in the source image, including other bodily features and inanimate objects. FIG. 2 is a flowchart illustrating a similar technique 200 generalized to modify objects represented in a destination image by corresponding objects in a source image. In block 210, the destination image may be analyzed. In block 220, a representations of an object of interest is detected and selected. The image library is searched for images containing representations of corresponding objects in block 230. One or more source images may be selected in block 240, and sample data created by extracting an object area from the one or more source images in block 250. Then the destination image may be modified in the region of the detected object with the sample data extracted from the one or more source images.

The technique 200 would be useful for enhancing or correcting images of locations. For example, an image may be captured at a popular location. The image has bad exposure and not enough data to correct well using conventional techniques. Or there may be a blurry object in the image that the user may wish to remove, although the user may wish to remove non-blurry objects, as well. (e.g., the user may wish to remove an image of a bystander from a picture.) In this example, many other people have taken a photo in that same location at various times, and uploaded those photos to a shared library of images coupled to a server. The destination image may be automatically or manually enhanced or corrected based on sample data from the other photos that have been uploaded to the server. In this example, source images may be selected that were taken at approximately the same location. A location identifier, such as geodata information associated with the destination image, may be ascertained, then the search of the library of images may identify the source images by matching their location identifiers with the location identifier of the destination image. The sample data extracted from the source images may allow the various kinds of enhancements, including removal of blurry obstructions (e.g., walking passersby) and exposure correction (e.g., the destination image was underexposed, but the library has sample data on hundreds or thousands of correctly exposed photos of the same location at the same time of day, and may use sample data that to repair the photo). The modifications may include replacing data in the photo with better data from other one or more source images in the library. In a variant, the techniques may be used to inform an imaging device as to the best possible imaging attributes, such as exposure or level adjustments, to apply to the imaging, before the image is captured. (For example, a person standing at a very popular place on the edge of the Grand Canyon may be able to take a better image by obtaining sample data from thousands of other images captured at that time of day at that spot.)

The amount of the destination image that can be modified using sample data from the source images is not limited. Any portion or the complete image may be modified. For example, a simple snapshot taken at a popular tourist site may be enhanced, corrected, or even potentially completely replaced by sample data extracted from one or more images captured at the same popular tourist site.

Figure 3:
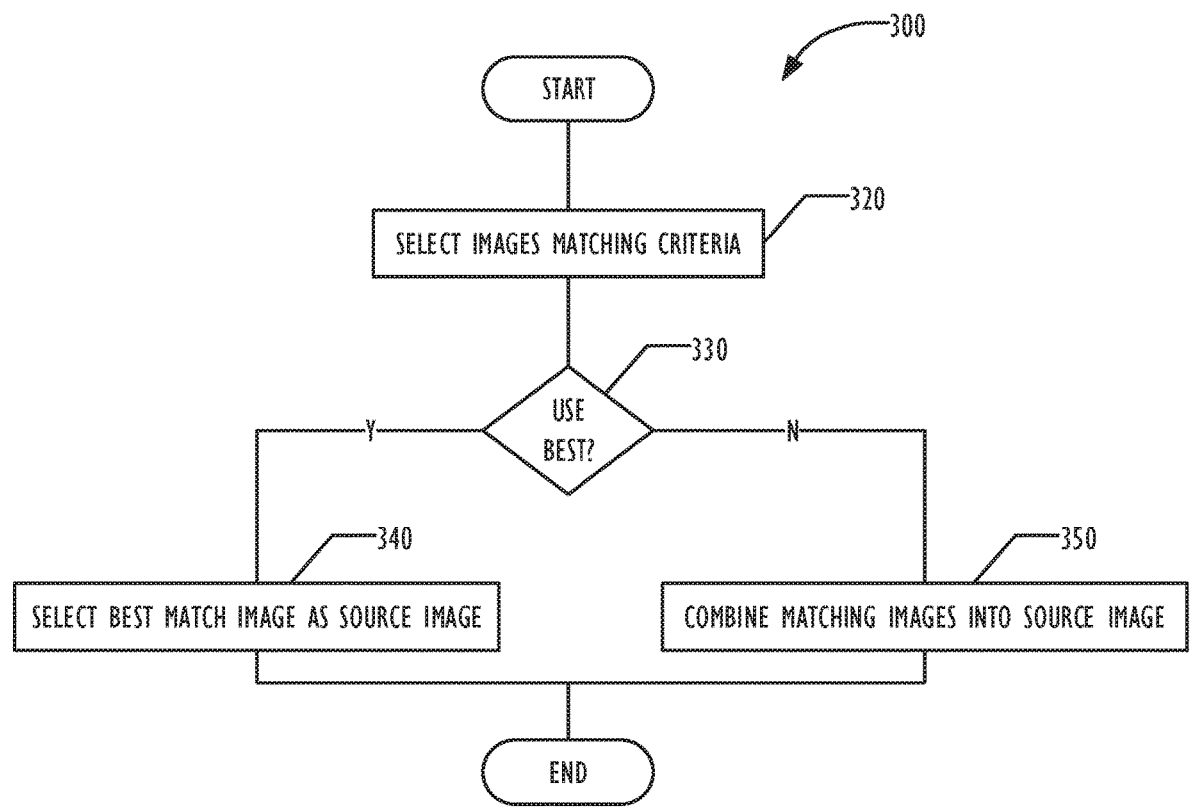
FIG. 3 is a flowchart illustrating a technique for selecting a best matching image or a combination of images as a source image for obtaining sample data to modify a destination image.

FIG. 3 is a flowchart illustrating a technique 300 in which multiple source images may be selected that match elements of the destination image used for searching the image library. In block 320, a search is made for images containing matching representations of the object (facial or otherwise). In block 330, if multiple images are returned by the search, a choice may be made whether to use the single best matching image (block 340), or some combination of multiple matching images (block 350). If multiple matching images are to be selected, then in block 350 the images or the regions of the images corresponding to the object of the destination image to be modified that are extracted from those images may be combined into a combined region that provides sample data for use in modifying the destination image. Any combination technique may be used, including averaging of the multiple source images. The combination region sample data may then be used for the correction of the destination image.

Implementation in a Programmable Device

Figure 4:
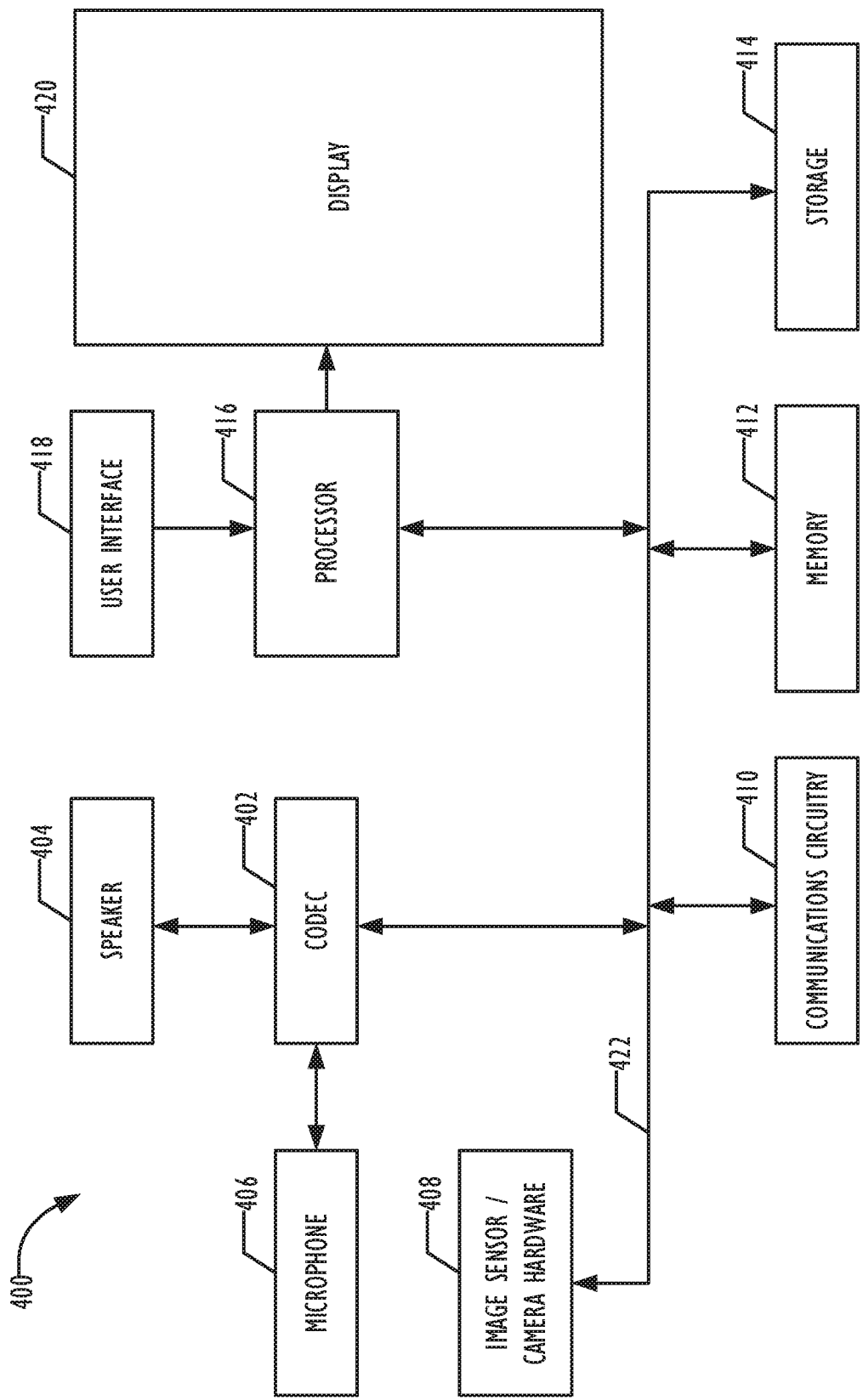
FIG. 4 a block diagram illustrating a programmable device for implementing the techniques described herein.

FIG. 4 is a simplified functional block diagram illustrating an programmable device 400 according to one embodiment that can implement the techniques described above. The programmable device 400 may include a processor 416, display 420, microphone 406, audio/video codecs 402, speaker 404, communications circuitry 410, an image sensor with associated camera hardware 408 for performing image capture, user interface 418, memory 412, storage device 414, and communications bus 422. Processor 416 may be any suitable programmable control device and may control the operation of many functions, such as the generation and/or processing of image data, as well as other functions performed by programmable device 400. Processor 416 may drive display 420 and may receive user inputs from the user interface 418. An embedded processor provides a versatile and robust programmable control device that may be utilized for carrying out the disclosed techniques.

Storage device 414 may store media (e.g., image and video files), software (e.g., for implementing various functions on device 400), preference information, device profile information, and any other suitable data. Storage device 414 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 412 may include one or more different types of memory which may be used for performing device functions. For example, memory 412 may include cache, ROM, and/or RAM. Communications bus 422 may provide a data transfer path for transferring data to, from, or between at least storage device 414, memory 412, and processor 416. Although referred to as a bus, communications bus 422 is not limited to any specific data transfer technology. User interface 418 may allow a user to interact with the programmable device 400. For example, the user interface 418 can take a variety of forms, such as a button, keypad, dial, a click wheel, or a touch screen.

In one embodiment, the programmable device 400 may be an programmable device capable of processing and displaying media, such as image and video files. For example, the programmable device 400 may be a device such as such a mobile phone, personal data assistant (PDA), portable music player, monitor, television, laptop, desktop, and tablet computer, or other suitable personal device.

The storage device 414 may provide storage for the library of images described above. Alternately, an external library of images may be communicatively coupled to the programmable device 400, as illustrated below in FIG. 5.

Implementation in a Networked System

Figure 5:
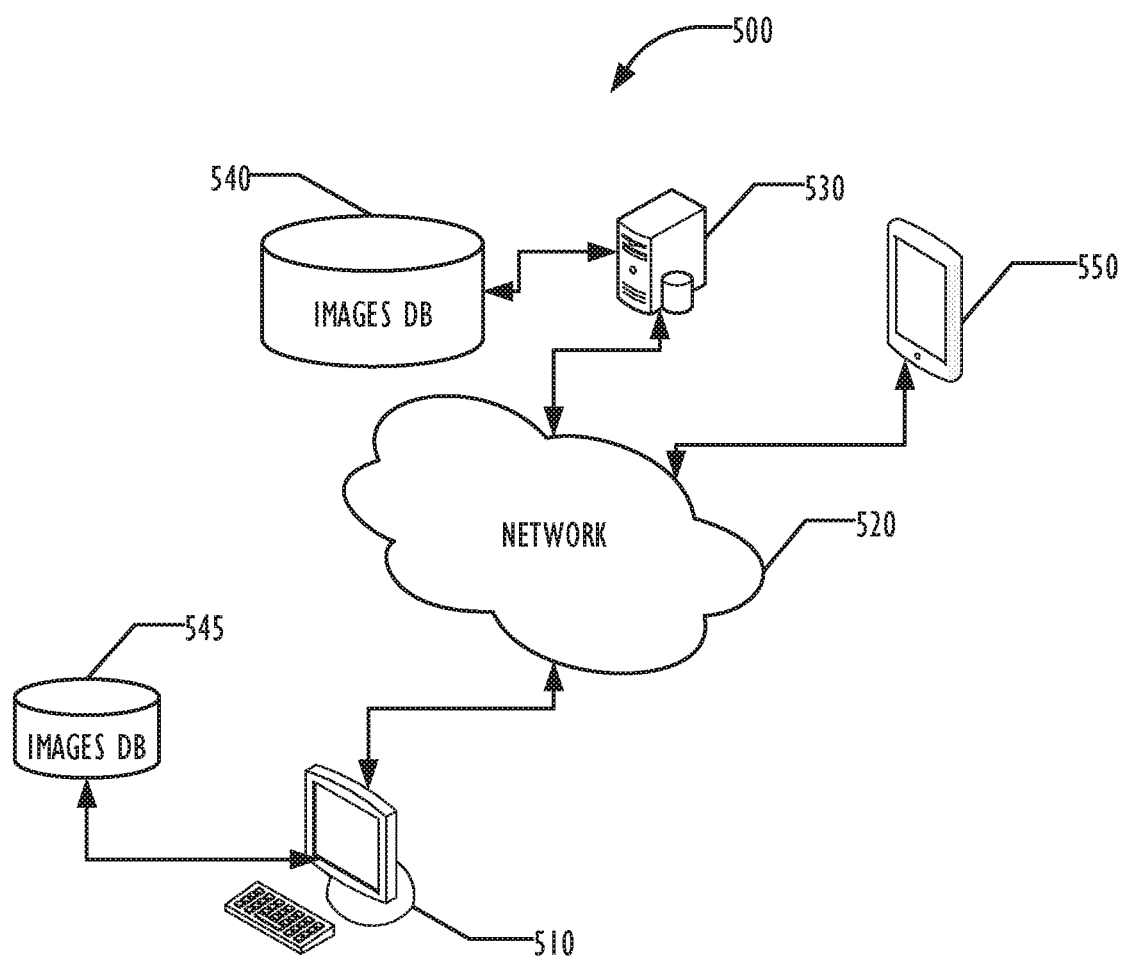
FIG. 5 a networked system illustrating use of remote and local libraries of images for modifying a destination image.

FIG. 5 is a block diagram of a system 500 for implementing the techniques described above. In this example system, a desktop device 510 and a tablet device 550 are both communicatively connected via a network 520 to a server 530. The server 530 provides access to an images database 540 that serves as the library of images described above, allowing desktop device 510 and tablet device 550 use of the library of images for modifying images. In addition, in this example desktop device 510 has a local images database 545 that may be used instead of or in addition to the remote images database 540. Although illustrated as a single network 520, network 520 may be any collection of connected networks, including local area networks and wide area networks, and may be communicatively connected to desktop device 510 and tablet device 550 using wired or wireless connectivity.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A computer-implemented method for image capture, comprising:
    obtaining one or more of geodata information or time information associated with an imaging device, prior to capturing a first image with the imaging device;
    identifying a plurality of second images external to the imaging device based on the one or more of the geodata information or the time information;
    determining an image capture condition associated with the plurality of second images based on a first characteristic of a first one of the plurality of second images and a second characteristic of a second one of the plurality of second images; and
    modifying a setting of the imaging device to be used for capturing the first image based on the determined image capture condition.

2. The method of claim 1, wherein the image capture condition comprises lighting information associated with the plurality of second images.

3. The method of claim 1, wherein the image capture condition comprises an object that is common to each of the plurality of second images.

4. The method of claim 1, wherein identifying the plurality of second images comprises searching a database of images for the plurality of second images, wherein the search is constrained by one or more predetermined criteria.

5. The method of claim 4, wherein the one or more predetermined criteria comprise one or more of the geodata information or the time information associated with the first image.

6. The method of claim 4, wherein the search of the database is constrained by a temporal window, and wherein each of the plurality of second images is captured during the temporal window.

7. The method of claim 1, further comprising combining corresponding regions from the plurality of second images to generate a third image,
    wherein the determined image capture condition is associated with the third image, and wherein the setting of the imaging device is modified based on the image capture condition associated with the third image.

8. A non-transitory computer readable medium storing a program for image capture, the program comprising instructions that, when executed by one or more processors, cause the one or more processors to:
    obtain one or more of geodata information or time information associated with an imaging device, prior to capturing a first image with the imaging device;
    identify a plurality of second images external to the imaging device based on the one or more of the geodata information or the time information;
    determine an image capture condition associated with the plurality of second images based on a first characteristic of a first one of the plurality of second images and a second characteristic of a second one of the plurality of second images; and
    modify a setting of the imaging device to be used for capturing the first image based on the determined image capture condition.

9. The non-transitory computer readable medium of claim 8, wherein the image capture condition comprises lighting information associated with the plurality of second images.

10. The non-transitory computer readable medium of claim 9, wherein the image capture condition comprises an object that is common to each of the plurality of second images.

11. The non-transitory computer readable medium of claim 9, wherein the instructions that, when executed by the one or more processors, cause the one or more processors to identify the plurality of second images comprise instructions that, when executed by the one or more processors, cause the one or more processors to search a database of images for the plurality of second images, wherein the search is constrained by one or more predetermined criteria.

12. The non-transitory computer readable medium of claim 11, wherein the one or more predetermined criteria comprise one or more of the geodata information or the time information associated with the first image.

13. The non-transitory computer readable medium of claim 11, wherein the search of the database is constrained by a temporal window, and wherein each of the plurality of second images is captured during the temporal window.

14. The non-transitory computer readable medium of claim 8, wherein the program further comprises instructions that, when executed by the one or more processors, cause the one or more processors to combine corresponding regions from the plurality of second images to generate a third image,
    wherein the determined image capture condition is associated with the third image, and wherein the setting of the imaging device is modified based on the image capture condition associated with the third image.

15. An electronic device for image capture, comprising:
    an imaging device;
    memory storing instructions that, when executed, cause one or more processors to:
        obtain one or more of geodata information or time information associated with the imaging device, prior to capturing a first image with the imaging device;
        identify a plurality of second images external to the imaging device based on the one or more of the geodata information or the time information;
        determine an image capture condition associated with the plurality of second images based on a first characteristic of a first one of the plurality of second images and a second characteristic of a second one of the plurality of second images; and
        modify a setting of the imaging device to be used for capturing the first image based on the determined image capture condition.

16. The electronic device of claim 15, wherein the image capture condition comprises lighting information associated with the plurality of second images.

17. The electronic device of claim 16, wherein the image capture condition comprises an object that is common to each of the plurality of second images.

18. The electronic device of claim 16, wherein the instructions that, when executed, cause the one or more processors to identify the plurality of second images comprise instructions that, when executed, cause the one or more processors to search a database of images for the plurality of second images, wherein the search is constrained by one or more predetermined criteria.

19. The electronic device of claim 18, wherein the one or more predetermined criteria comprise one or more of the geodata information or the time information associated with the first image.

20. The electronic device of claim 18, wherein the search of the database is constrained by a temporal window, and wherein each of the plurality of second images is captured during the temporal window.

21. The electronic device of claim 15, further comprising instructions that, when executed, cause the one or more processors to combine corresponding regions from the plurality of second images to generate a third image,
    wherein the determined image capture condition is associated with the third image, and wherein the setting of the imaging device is modified based on the image capture condition associated with the third image.

* * * * *